United States Patent [19]
Rees

[11] Patent Number: 6,083,449
[45] Date of Patent: Jul. 4, 2000

[54] PROCESS FOR PRODUCING A CONTAINER

[75] Inventor: Herbert Rees, Orangeville, Canada

[73] Assignee: The Elizabeth and Sandor Valyi Foundation, Inc., New York, N.Y.

[21] Appl. No.: 09/375,818

[22] Filed: Aug. 16, 1999

Related U.S. Application Data

[62] Division of application No. 09/018,094, Feb. 3, 1998, Pat. No. 5,971,740.

[51] Int. Cl.⁷ .......................... B29C 49/02; B29C 49/22; B29C 43/20
[52] U.S. Cl. ............................................. 264/512; 264/535
[58] Field of Search ...................................... 264/511, 512, 264/523, 550, 294, 296, 320, 535; 425/523, 528, 534, 126.1, 522, 515, 517, 521, 526

[56] References Cited

U.S. PATENT DOCUMENTS

| | | | |
|---|---|---|---|
| 3,717,544 | 2/1973 | Valyi | 425/523 |
| 3,737,259 | 6/1973 | Valyi | 425/112 |
| 4,116,606 | 9/1978 | Valyi | 425/526 |
| 4,147,748 | 4/1979 | Saumsiegle | 264/523 |
| 4,224,275 | 9/1980 | Sauer | 264/516 |
| 4,432,719 | 2/1984 | Hafele | 425/526 |
| 5,647,930 | 7/1997 | Bright | 156/73.5 |

*Primary Examiner*—Jan H. Silbaugh
*Assistant Examiner*—Dae Young Lee
*Attorney, Agent, or Firm*—Bachman & LaPointe, P.C.

[57] ABSTRACT

A compression mold and blow mold are provided in spaced relationship to each other. A preform is formed from a preform precursor in the compression mold and transferred to a blow mold while maintaining the spaced relationship between the compression mold and blow mold, and a container is formed from the preform in the blow mold.

12 Claims, 7 Drawing Sheets

PROCESS FOR PRODUCING A CONTAINER

This is a Division, of application Ser. No. 09/018,094, filed Feb. 3, 1998, now U.S. Pat. No. 5,971,740.

BACKGROUND OF THE INVENTION

The present invention relates to a process and apparatus for the production of containers, e.g., jars, cups, bottles, etc., from plastic material, such as polyethylene terephthalate (PET), including optionally adding barriers during the molding process to impart special properties.

Many of these plastic containers must be adequately impermeable to moisture, alcohol, $CO_2$, oxygen, etc., and also be able to withstand pressurization where required. They may be used, for example, for storing soft drinks, beer, fruit juices, and the like. Another important requirement for these containers is that the molded plastic should not give off an offensive odor or taste.

However, when molding PET, it is very difficult if not impossible to avoid the presence of acetaldehyde (AA) which does impart a disagreeable taste to the stored product. Unfortunately, AA is an unavoidable by product when heating PET, and the amount generated is directly related to the heat history of the plastic from its manufacture to the final blowing operations. Whenever the PET is heated, the amount of released AA increases. The industry specifies maximum allowable limits for the presence of AA in PET containers.

In conventional methods of injection molding and blow molding processes for these products, the plastic during its manufacture is hot, then extruded, cooled and pelletized into granules which are supplied to the injection molding machine, where the plastic is again heated in the extruder for the molding of the preforms.

In the one-stage method, after molding the not fully cooled preforms are partly heated and their temperature stabilized as required. The preforms are then transferred to a blow station for final processing. In the two-stage method, the preforms are cooled completely after molding. They are then reheated and stabilized for final blow molding. In both of these methods, the preforms are heated from the outside only, and must be heated above the required blowing temperature so that the plastic can stabilize at the required temperature with the temperature distributed evenly from the outside to the inside. Either method generates a considerable heat history for the plastic, and results in higher and more difficult to control AA levels, and can easily lead to rejects.

It is important to consider that a harmful heat history requires starting the process of making the container with a substantially more expensive polymer than that which is required to meet the properties of the final container. Thus, it is particularly advantageous to start with substantially the same quality of polymer as will be found in the finished container. A higher grade of polymer is substantially more costly than that which is the result of degradation due to the use of the conventional process, i.e., injection stretch blow molding.

Accordingly, it is a principal object of the present invention to provide a process and apparatus for conveniently, expeditiously and economically forming a plastic container.

It is a further object of the present invention to provide a process and apparatus as aforesaid which forms a container from a preform precursor and preform in a continuous operation.

It is a still further object of the present invention to provide a process and apparatus as aforesaid which substantially reduces the heat history of the plastic and reduces the AA content.

SUMMARY OF THE INVENTION

In accordance with the present invention, the foregoing objects and advantages are readily obtained.

The present invention includes a process for producing a container, which comprises: supporting a compression mold and blow mold in spaced relationship to each other; placing a heated preform precursor in said compression mold and forming said precursor into the shape of a preform in said compression mold; moving said preform from said compression mold to said blow mold while maintaining the spaced relationship between said compression mold and blow mold; and forming said preform into a container in said blow mold. In a preferred embodiment, the compression mold and blow mold are supported by movable support means which maintains the spaced relationship therebetween and which moves the compression mold and blow mold from a first to a second position and back to a first position, and including the steps of moving the compression mold and blow mold to said first position for forming said preform, and moving said compression mold and blow mold to said second position for placing said preform into said blow mold, and moving said compression mold and blow mold back to said first position for forming said container. Desirably, in a preferred embodiment, a liner is employed to form a preform having at least two layers and a resultant container having at least two layers.

The apparatus of the present invention includes a compression mold and a blow mold in spaced relationship to each other, means for forming a preform from a heated preform precursor in said compression mold, means for moving said preform from said compression mold to said blow mold while maintaining the spaced relationship between said compression mold and blow mold, and means to form said preform into a container in said blow mold.

Advantageously, the process and apparatus of the present invention reduces the heat history of the plastic and therefore reduces the AA content in the case of PET by eliminating the heating steps required in conventional injection blow molding methods of making these containers, and therefore operates at lower temperatures and does not cause heating of the plastic that results in degradation thereof. This advantageously reduces the amount of energy required in the overall process and apparatus and therefore can significantly reduce the costs in producing the final product. In addition and significantly the present invention permits starting with substantially the same grade of polymer as will be found in the finished container.

Further advantages and features of the present invention will appear hereinbelow.

BRIEF DESCRIPTION OF THE DRAWINGS

The present invention will be more understandable from a consideration of the foregoing illustrative examples, wherein.

DETAILED DESCRIPTION OF PREFERRED EMBODIMENTS

Referring to FIGS. 1–4 and 7, the apparatus and process of the present invention includes a compression mold 10 and blow mold 12 in fixed, spaced relationship to each other mounted on a movable support means or shuttle 14. Shuttle 14 is guided by guide rails 15 for moving the compression mold and blow mold together from a first position shown in FIGS. 1 and 2 to a second position shown in FIG. 3 while maintaining the fixed, spaced relationship therebetween.

Figure 2:
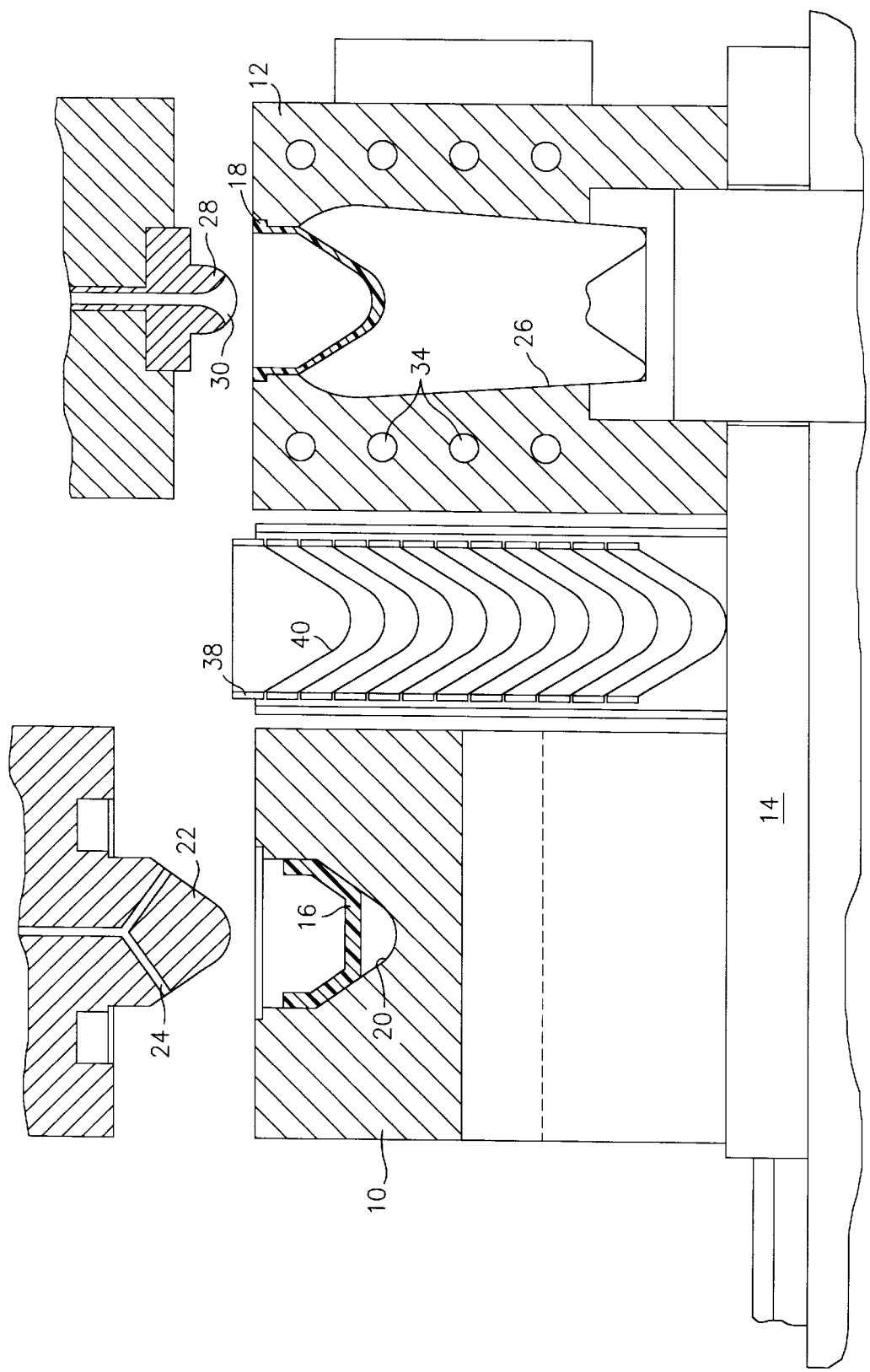
FIG. 2 is a side view of the apparatus of FIG. 1 on an enlarged scale including additional components.

The compression mold 10 contains a heated precursor 16 which has been placed in the compression mold in the heated state from schematically shown heating and supply means 17 which are an integral part of the present process and apparatus as will be described below. Precursor 16 is preheated to a predetermined temperature suitable for compression molding of a preform 18 and subsequent blowing into the final shape which is the shape of the blow mold. As shown in FIG. 2, precursor 16 is in the proper attitude in cavity 20 of compression mold 10 for formation of the preform.

Thus, as shown in FIG. 2, a preform precursor is placed in a compression mold 10 having a preform shaped impression or cavity 20. The preform precursor must have the same weight as the preform to be made therefrom. The preform precursor may be a partly formed preform and the particular shape of the preform precursor 16 is not especially critical. It generally differs from the preform substantially only in that it requires corrections with regard to contour and wall thickness to become the preform. The precursor is formed by any suitable known means, as by thermoforming, injection molding or compression molding. The precursor may be laminated if desired to form a laminated preform, as for example, a preform with two or more layers.

Figure 7:
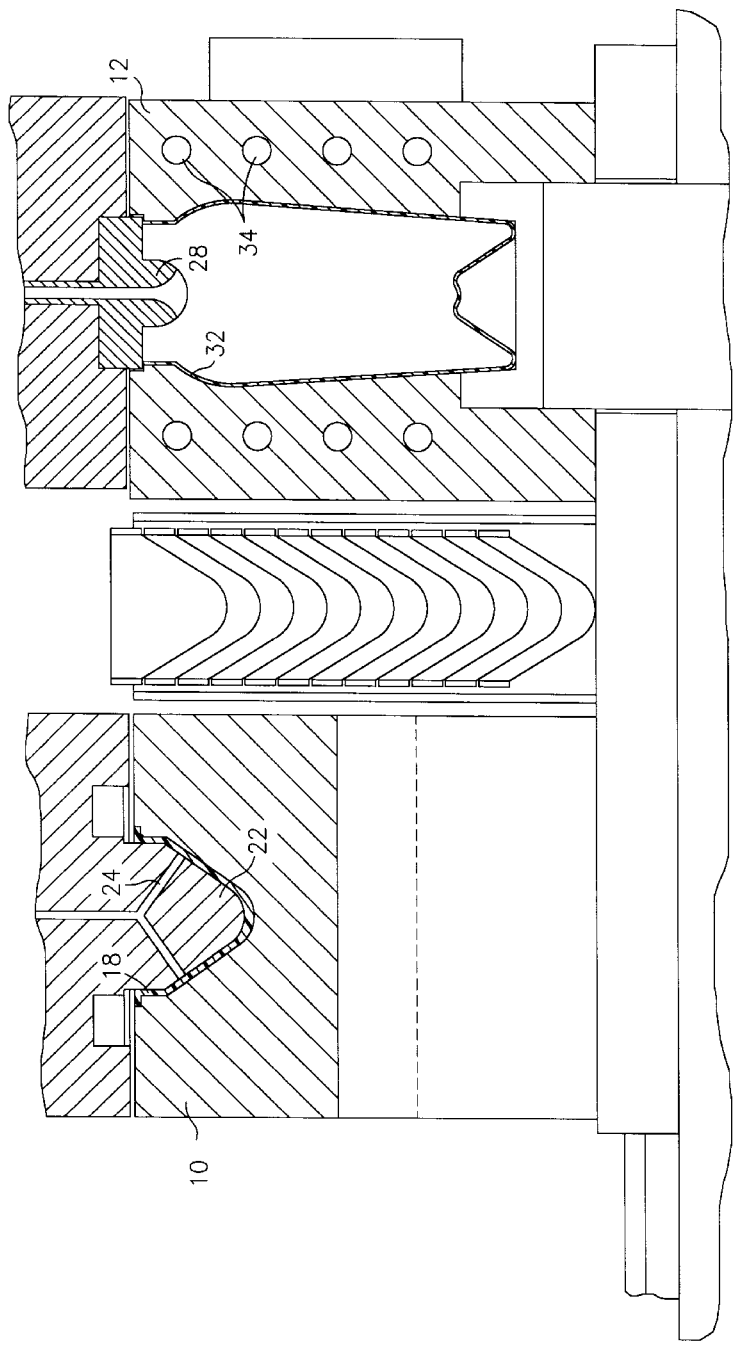
FIG. 7 is a view similar to FIG. 2 showing the components in a further stage of operation.

Precursor 16 is formed into a preform 18 by the interaction of a compression molding means, as compression molding core 22 and compression mold 10 as shown in FIG. 7 to form preform 18 in the compression mold, with core 22 moving into mold 10 by suitable motive means (not shown).

Figure 1:
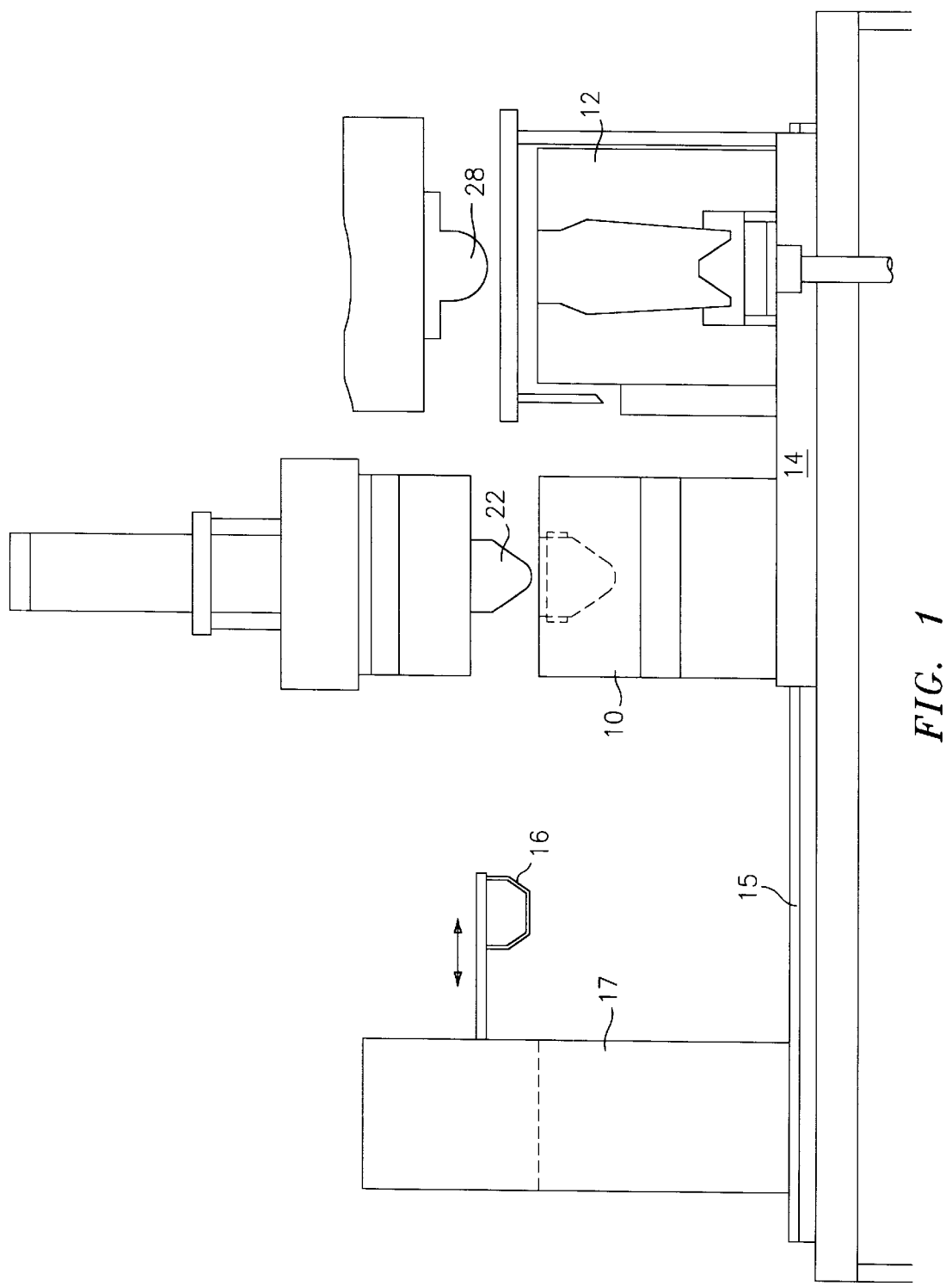
FIG. 1 is a side view of an apparatus of the present invention in a first position.
Figure 3:
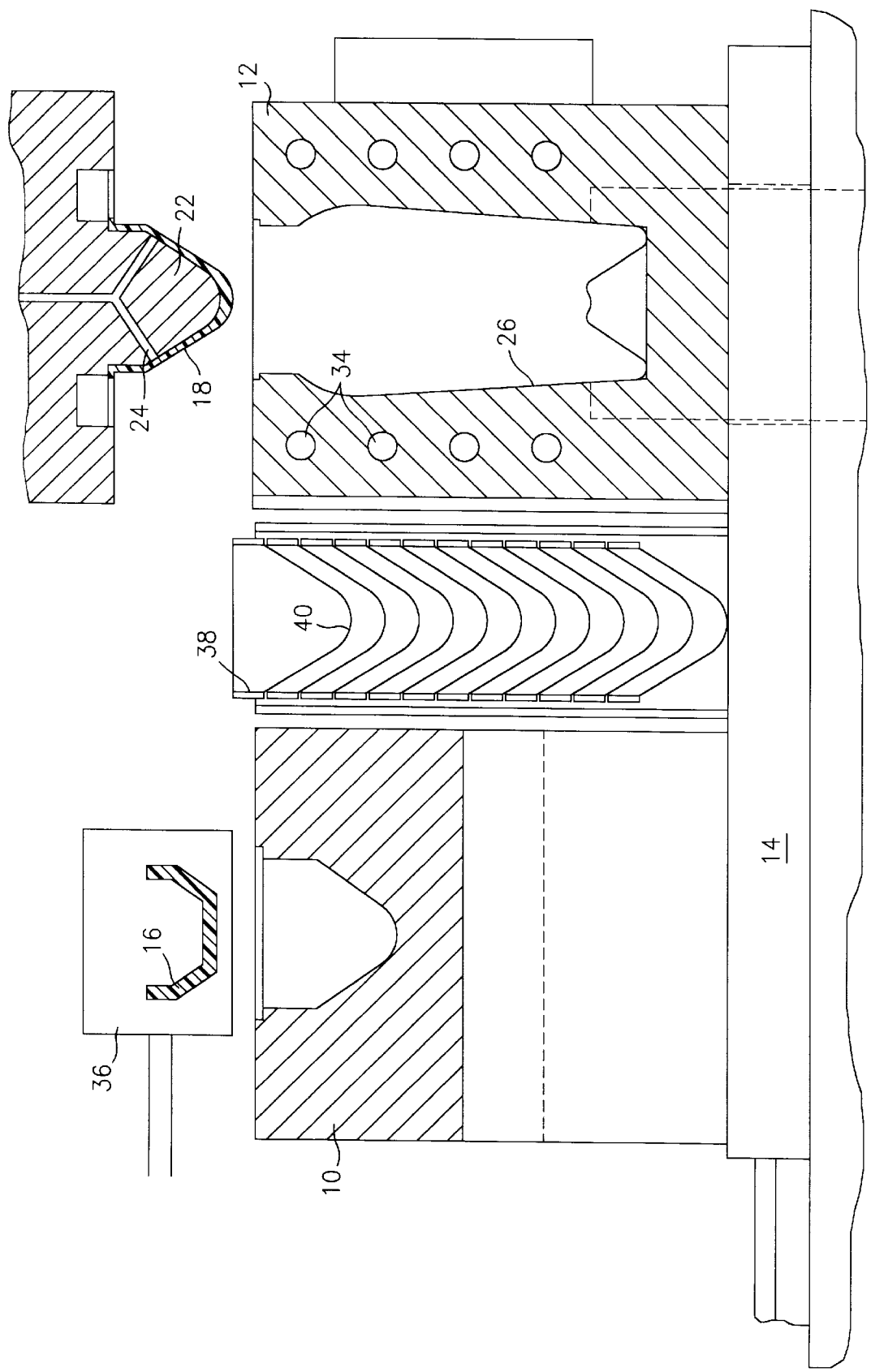
FIG. 3 is a side view of the apparatus of FIG. 2 in a second position and on an enlarged scale.

After formation of the preform 18 in compression mold 10, core 22 with preform 18 held thereon as by suction via channels 24, moves upwardly away from the compression mold and shuttle 14 moves the compression mold and blow mold from the first position shown in FIGS. 1 and 2 to the second position shown in FIG. 3. In the second position shown in FIG. 3, the preform 18 held on core 22 is now in position adjacent blow mold 12. Core 22 with preform 18 thereon then deposits preform 18 into blow mold cavity 26 as shown in FIG. 2, by any desired means as by blowing air through channels 24 to strip preform 18 off core 22. Core 22 is then moved away from the blow mold 12 with preform 18 therein by shuttle 14 moving the compression mold and blow mold from the second position shown in FIG. 3 back to the first position shown in FIGS. 1 and 2 for repeat of the cycle.

In the first position as shown in FIG. 2, a blow molding means, as blow core 28 is now in position adjacent blow mold 12 with preform 18 therein. The blow core 28 then descends as shown in FIG. 7 to seal preform in mold cavity 26 which permits the admission of compressed gas, as air, via blow core channels 30 and form container 32 in blow mold cavity 26. If desired, blow core 28 may also include a stretch rod (not shown) to maintain concentricity of the hot preform in the blow mold. This occurs while the preform is still hot from the previous cycle. Blow mold 12 contains cooling channels 34 to rapidly cool the newly formed container 32.

As shown in FIG. 7, while the blow core 28 is interacting with blow mold 12 to form container 32, compression mold core 22 is forming preform 18 in compression mold 10 for the next cycle.

Precursors 16 are held at elevated temperature in a precursor heating and supply means 17 which includes suitable means for providing and maintaining the desired temperature of the precursor (not shown), as by radio frequency or microwave heating, heating coils, or the like, adjacent compression mold 10 and are fed one at a time to the compression mold at their elevated temperature via precursor supply arm 36 shown schematically in FIG. 3 while the compression mold and blow mold are in the second position. The precursors are held in the precursor supply means at a predetermined temperature suitable for compression molding into the preform, and for subsequent blowing into the desired container. It is particularly advantageous that the entire cycle can be carried out from heated precursor to final blow molding while substantially maintaining the heat content of the precursor, i.e., the cycle is carried out substantially at the temperature of the heated precursor.

Figure 4:
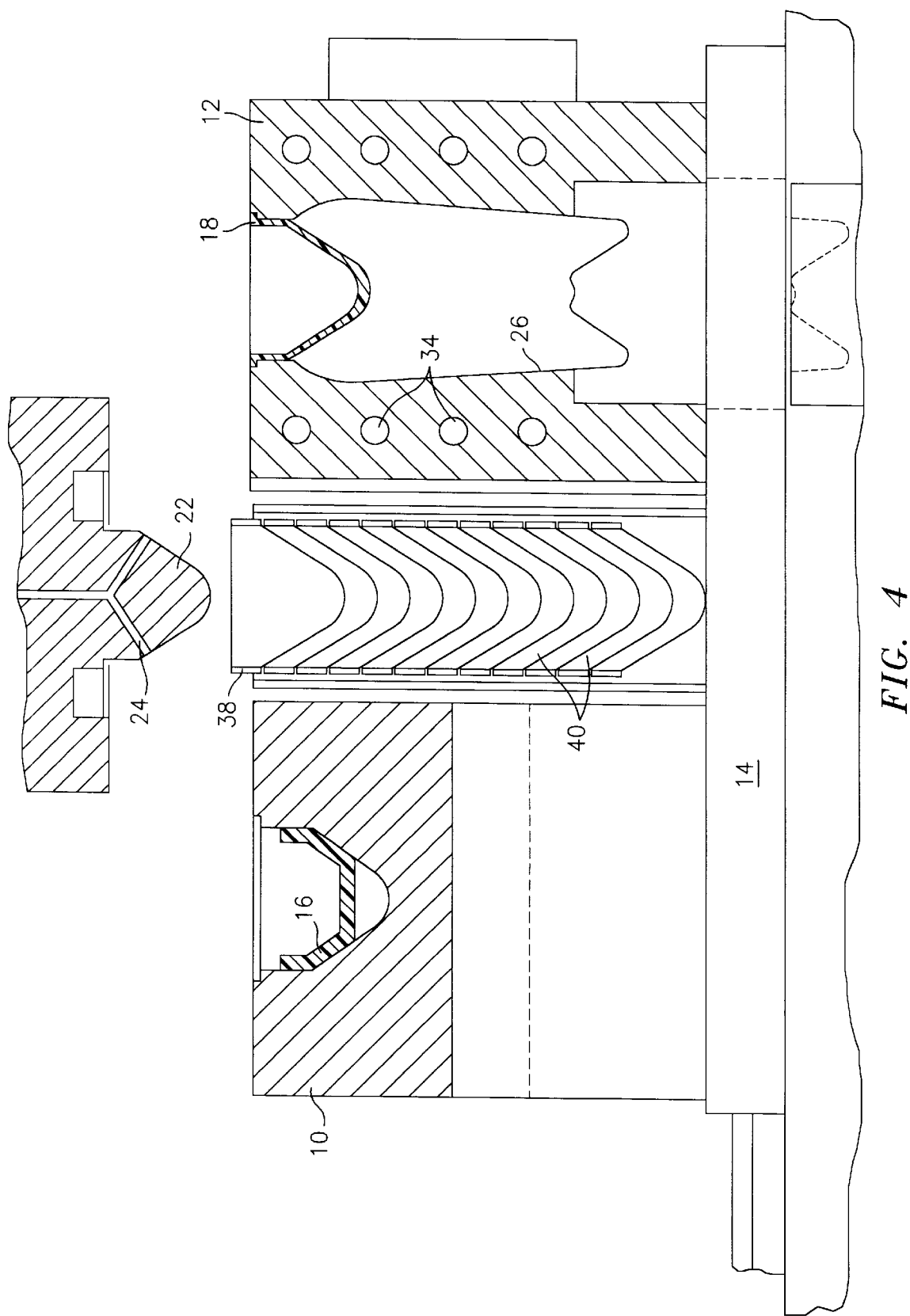
FIG. 4 is a side view of the apparatus of FIG. 2 on an enlarged scale in a third intermediate position.

As indicated above, the precursor and/or preform may have two or more layers to form a container with two or more layers. An advantageous procedure for forming a laminated preform is to provide a liner or sleeve dispensing device 38 for holding a plurality of liners 40 between the compression mold 10 and blow mold 12 supported by shuttle 14 and movable by the shuttle together with the compression mold and blow mold. Thus, when compression mold core 22 is returning from the second position to the first position without a preform thereon, the compression mold, blow mold and liner dispensing device are moved to a third position as shown in FIG. 4. In this third position, core 22 is adjacent liners 40 and descends to pick up a liner via suction through channels 24. Core 22 with a liner thereon is then lifted, the shuttle moves back to position one and forms a laminated preform from the precursor and liner. The liners may be cold or slightly heated and have the shape of the core 22. As the compression mold is closed with core 22 having a liner thereon and engaging mold 10 as shown in FIG. 7, the liner is heated by contact with the hot core 22 and the heated mass of the precursor 16 and bonds to the precursor during compression molding of the preform. Naturally, other methods may be used to load the liner on core 22, as by a feeding arm removing a liner from an adjacent dispensing device and placing same on core 22 before core 22 engages mold 10 to form the preform.

Figure 5:
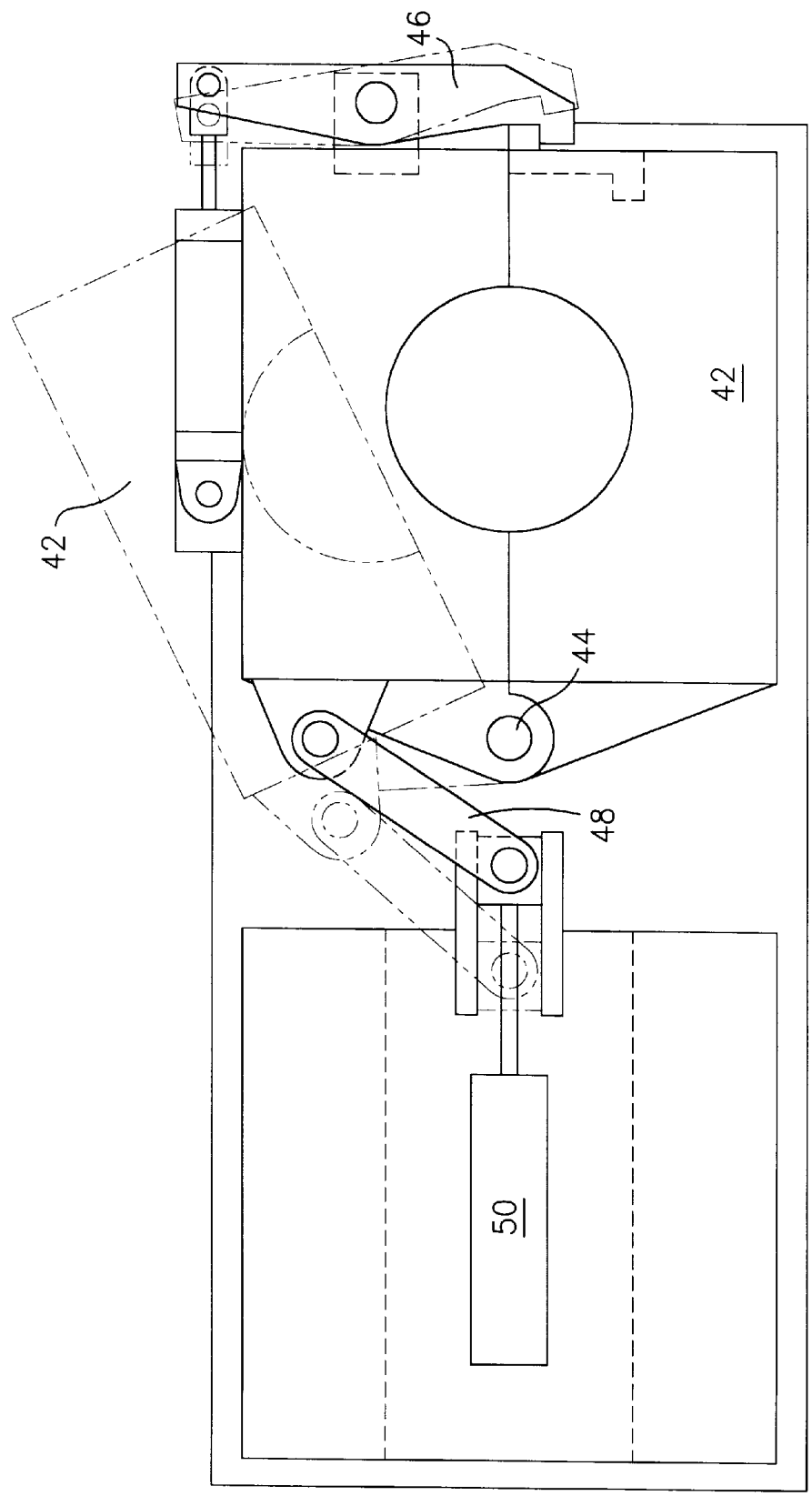
FIG. 5 is a bottom view of the apparatus for opening the blow mold.
Figure 6:
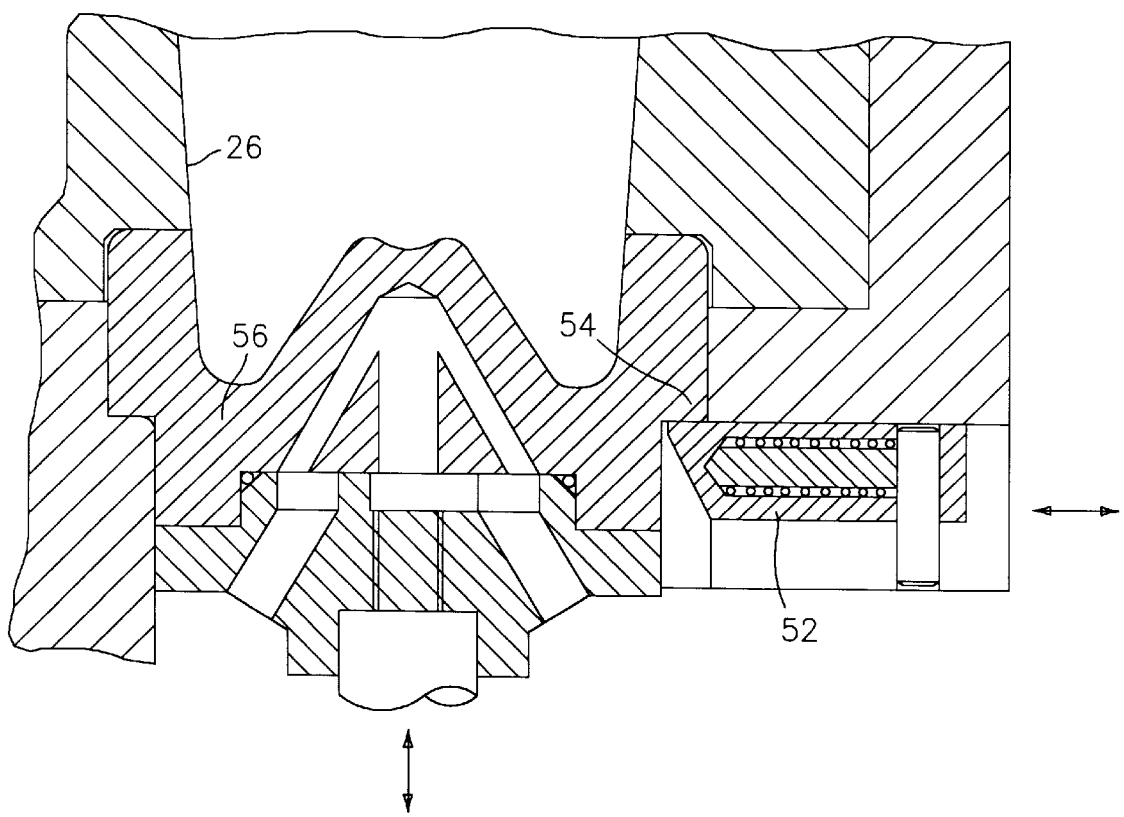
FIG. 6 is a detailed side view of the base of the blow mold.

Referring to FIGS. 5–6, as soon as container 32 is blown, the two hinged blow mold halves 42, which can rotate on hinge pin 44, are unlocked by the opening of latch 46 or similar unlocking means and swing open as shown in phantom for one of the mold halves in FIG. 5 by the action of links 48 and actuator or operator 50 which may be of any convenient type, as a pneumatic cylinder operated by suitable actuating means (not shown). As the mold halves 42 swing open, they disengage the spring loaded bars 52 from blow mold base surface 54 where bars 52 supported the blow mold base 56. This permits the blow mold base to be lowered below shuttle 14 and permits removal of container 32 out of blow mold cavity 26 by any desired means, as by a removal arm, mechanical grippers or suction cups or by simply blowing the product out of the molding area. As soon as the final container 32 is removed, the blow mold cavity 26 is reclosed by action of actuator or operator 50 and reverse movement of the components as set out in the blow mold opening procedure, and locking with latch 46. The assembly is now free for another cycle as soon as the compression molding cycle is completed. The time required for the blowing operation is shorter than the time required for compression molding, so that there is sufficient time for all of the associated motions of unlocking, swinging open, up and down motions of the blow mold base, swinging closed and locking of the blow mold cavity.

As soon as compression mold 10 has opened with the newly molded preform 18 positioned on core 22, the next cycle can proceed.

The apparatus and process of the present invention are highly advantageous. They substantially reduce the heat history of the plastic and therefore in the case of PET the AA content by eliminating heating steps required by conventional operations, and can operate at lower temperatures. The compression mold is advantageously maintained at the temperature of compression molding which is close to that of blow molding. The continuous process enables one to proceed directly from a heated precursor with no reheating required. The present invention avoids thermal degradation, reduces the amount of energy required, reduces cycle time, and can significantly reduce the cost of preparing the final product. In addition and significantly, the present process and apparatus starts with substantially the same quality of polymer as will be found in the finished container.

Naturally, variations are possible in the process and apparatus of the present invention, as for example, one can maintain the blow mold and compression mold stationary and move the respective cores in the cycle.

It is to be understood that the invention is not limited to the illustrations described and shown herein, which are deemed to be merely illustrative of the best modes of carrying out the invention, and which are susceptible of modifications of form, size, arrangement of parts and details of operation. The invention rather is intended to encompass all such modifications which are within its spirit and scope as defined by the claims.

what is claimed is:

1. Process for producing a container, which comprises: providing a preformed precursor which is a partly formed preform with a cavity therein; supporting a compression mold and blow mold in spaced relationship to each other; providing heating and supply means for said preformed precursor spaced from said compression mold; heating said precursor to a heated temperature and maintaining said heated temperature of said precursor with said heating means; moving said heated precursor to said compression mold with said supply means, wherein said compression mold has a shape so that said precursor fits within said compression mold; placing said heated precursor in said compression mold and forming said precursor into a preform in said compression mold, said preform having the shape of said compression mold; moving said preform from said compression mold to said blow mold while maintaining the spaced relationship between said compression mold and blow mold; and blow molding said preform into a container in said blow mold.

2. Process according to claim 1, including substantially maintaining a heat content of said header precursor to said blow molding.

3. Process according to claim 1, wherein said compression mold and blow mold are supported by movable support means which maintains a fixed spaced relationship therebetween and which moves the compression mold and blow mold together from a first to a second position and back to said first position, including the steps of moving said compression mold and blow mold to said first position for forming said preform from a precursor, moving said compression mold and blow mold to said second position for placing said preform into said blow mold, and moving said compression mold and blow mold back to said first position for forming said container.

4. Process according to claim 3, including the steps of positioning a compression molding means adjacent said compression mold in said first position for forming said preform, and positioning a blow molding means adjacent said blow mold in said first position for forming said container.

5. Process according to claim 4, including the step of forming said preform by interaction of said compression molding means and compression mold, and forming said container by interaction of said blow molding means and blow mold.

6. Process according to claim 4, including the steps of placing a liner on said compression molding means before forming said preform, and forming a preform from said precursor and liner wherein said preform has at least two layers.

7. Process according to claim 6, including positioning means-for holding a plurality of liners in fixed spaced relationship between said compression mold and blow mold, and wherein said compression mold and blow mold are moved to a third intermediate position before moving back to said first position, and placing a liner from said means for holding on said compression molding means at said third position.

8. Process according to claim 3, including the step of placing said precursor in said compression mold in said second position.

9. Process according to claim 1, including forming the container from the preform and forming the preform from the precursor in simultaneously occurring operations.

10. Process according to claim 1, including maintaining the desired temperature of the precursor, forming the container from the preform, and forming the preform from the precursor in simultaneously occurring operations.

11. Process according to claim 1, wherein said precursor has a shape that fits within said compression mold and has a weight which is the same as said preform.

12. Process according to claim 1, wherein said preform has at least two layers for forming a container with at least two layers.

* * * * *